United States Patent [19]

Randall

[11] 4,194,491
[45] Mar. 25, 1980

[54] SOLAR COLLECTOR PANEL

[76] Inventor: Eugene J. Randall, 603 Chambers Dr., Huntsville, Ala. 35801

[21] Appl. No.: 797,668

[22] Filed: May 17, 1977

[51] Int. Cl.² ............................................. F24J 3/02
[52] U.S. Cl. .................................................. 126/417
[58] Field of Search ............... 126/270, 271; 237/1 A; 165/170, 171, 172

[56] References Cited

U.S. PATENT DOCUMENTS

| | | | |
|---|---|---|---|
| 2,705,948 | 4/1955 | Rostock | 126/271 |
| 3,399,664 | 9/1968 | Suhay | 126/271 |
| 3,943,911 | 3/1976 | Yu | 126/271 |
| 4,022,184 | 5/1977 | Anderson | 126/271 |
| 4,030,478 | 6/1977 | Beaver, Jr. | 126/271 |
| 4,048,981 | 9/1977 | Hobb | 126/271 |
| 4,059,094 | 11/1977 | de Mendoza | 126/271 |
| 4,062,351 | 12/1977 | Hastwell | 126/271 |

FOREIGN PATENT DOCUMENTS 1157156  7/1969  United Kingdom ..................... 126/271

*Primary Examiner*—James C. Yeung
*Attorney, Agent, or Firm*—William G. Gapcynski; Werten F. W. Bellamy; Jack W. Voigt

[57] ABSTRACT

A closed core base having concave channels in its top face is fitted with a thermoplastic lens having corresponding convex channels. The channels form transfer passages which carry a liquid medium which absorbs solar energy as it flows through the passages. The base consists of an insulating core material having an outer skin fabricated in a solar absorbant color. The sides of the base are sloped for stacking and extend above the top of the conduit to support a clear cover. The core of the base is coated with a reflective material and filled with insulating material.

13 Claims, 6 Drawing Figures

SOLAR COLLECTOR PANEL

The invention described herein may be manufactured and used by or for the Government for governmental purposes without the payment of any royalty thereon.

BACKGROUND OF THE INVENTION

1. Field of the Invention

This invention generally relates to heat exchanger elements which are used for cooling or heating of a transfer media by use of solar or other energy. More specifically, the invention relates to solar collector panels for absorbing solar energy.

2. Description of the Prior Art

There are several types of solar collectors in the field. One type which is frequently used is the flat plate collector-type. This is made of a flat plate collector top sheet and a flat plate collector bottom sheet which are bonded together with transfer media passages formed in-between. It also includes a frame to retain component parts and insulation to retain gained energy.

An example of this type is illustrated in U.S. Pat. No. 3,918,430, issued to Harry E. Stout, et al. It teaches a rigid panel for solar heating, wherein plastic is bonded to the frame. The tubing which provides the transfer conduits is pre-installed. A simplified version of the Stout collector is disclosed in U.S. Pat. No. 3,089,480, issued to J. G. Duncan III.

Another type of solar collector known in the prior art is the focal point-type. U.S. Pat. No. 3,951,128 teaches a combination of the focal point and flat plate solar collector, wherein the sun's rays are reflected and focused behind and onto a conduit which carries the transfer media.

This invention differs from previous solar panel designs by its simplicity, reduction in the number of component parts, reduction in the number of manufacturing processes required for fabrication, and the maximum use of inexpensive materials.

SUMMARY OF THE INVENTION

The invention comprises a structural foam base having a cellular core with a solid outer skin. The core provides insulation properties and the skin provides a durable waterproof surface and assists the core in providing structural rigidity to the base. The sides of the base are sloped for stacking and support a clear plastic cover, which creates a greenhouse effect. The face of the base has parallel, diagonal grooves in it and is fitted with a thermoplastic lens. The lens has corresponding convex grooves which; together with the base grooves, form passages for the transfer media. The core of the base is coated with a reflective material and filled with insulating material to help retain heat.

It is an object of this invention to provide a solar collector panel which has simplicity of fabrication, fewer component parts, lower mass production costs, and is stackable.

It is another object of this invention to provide a solar collector panel having increased thermal efficiency by use of a solar penetratable lens bonded to a solar absorbant base, permitting the solar rays to enter directly into and be absorbed by the transfer media, and by permitting the use of transfer media coloring to further increase absorptive efficiency.

It is an additional object of this invention to provide a solar panel which has a low profile and is less noticeable, lightweight, and can be mounted on either a sloping horizontal or a sloping vertical.

It is yet a further object of this invention to provide a solar panel which is resistant to scale build up, expansion and contraction stress, freezing, breakage, sunlight ageing, and hail.

It is still another object of this invention to provide a solar panel which eliminates the requirement for a separate flat plate or other collector cell and which is a composite structure eliminating the requirement for a separate structural frame.

BRIEF DESCRIPTION OF THE DRAWINGS

Other objects and features of this invention will become apparent to those skilled in the art by referring to the preferred embodiment described in the following specification and shown in the accompanying drawing in which.

DESCRIPTION OF THE PREFERRED EMBODIMENT

Figure 3:
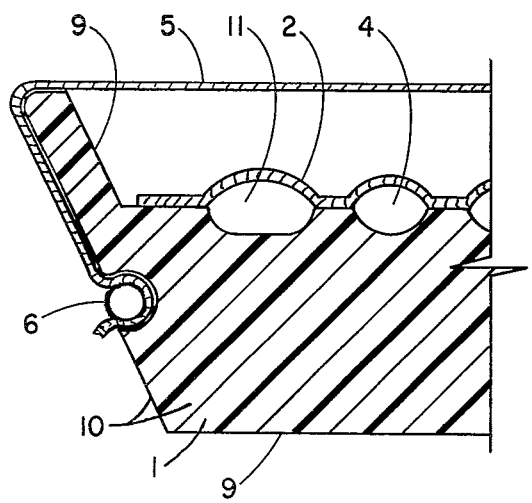
FIG. 3 is an enlarged fragmentary sectional view of the end of the solar panel shown in FIG. 2.
Figure 4:
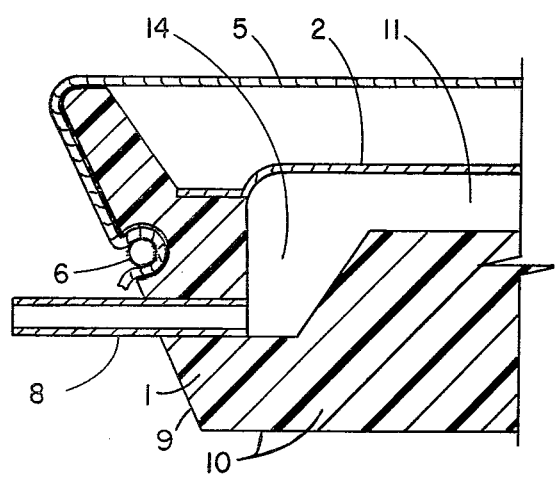
FIG. 4 is an enlarged fragmentary sectional view of the solar panel taken along line 4—4 of FIG. 1.

Referring to FIGS. 3 and 4, the base 10 is fabricated of structural foam, a monolithic material. In the manufacturing process, a single resin is injected into the mold. The surface solidifies to a greater density than the core 1. This area of greater density is generally referred to as surface skin 9.

The base 10 serves as a structure, frame, insulator, and absorber of the solar collector. It absorbs energy, retards energy loss, and forms the bottom half of the transfer media passageways 4. It is fabricated in a solar absorbant color, precluding the requirement for a supplemental coating. The skin 9 is typically 0.03 to 0.08 inches thick and helps give structural foam its strength and rigidity, and provides a tough, durable, waterproof surface. There are several processes for producing this type of structural foam, including the Union Carbide Process, the Beloit process, and a modified injection mold process. Structural foam, having a solid outer skin, can be assembled to other parts much like injection molded parts. Techniques such as ultrasonic bonding and hot plate welding will provide this bonding.

As noted in FIG. 4, a fill/exit tube 8 is bonded to the base 10. Drop well 14 permits the flow of the transfer media from the fill/exit tubes 8 to the manifold channel 11, which surrounds the perimeter of the transfer channels 4.

Figure 5:
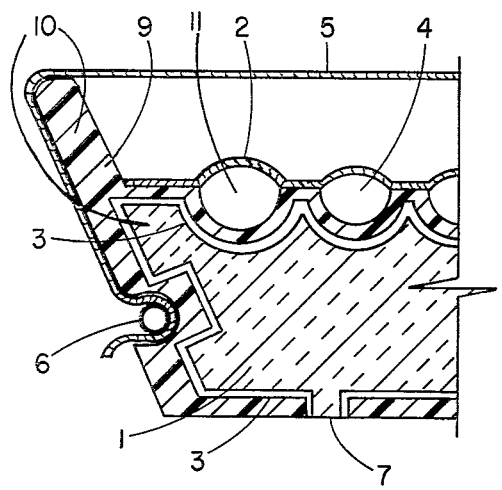
FIG. 5 is an enlarged fragmentary view of a cross section of a solar panel similar to that of FIG. 3; but providing for an alternate structure of the base.

The scope of this invention also includes two alternative core-type structures for the base 10. As shown in FIG. 5, the outer shell 9 of the base 10 is formed by means of conventional molding methods and the interior core 1 is filled by injecting insulation through the core hole 7. The resulting base has all the advantages and desirable properties of the structural foam base, plus the advantage of individual selection of skin and insulation materials each for their maximum respective properties (color, radiation transmittance, density). Prior to injecting insulation into the core 1, an optional solar-ray reflective coating 3 may be sprayed into the cavity to reflect heat energy back toward the transfer media passages 4.

Figure 6:
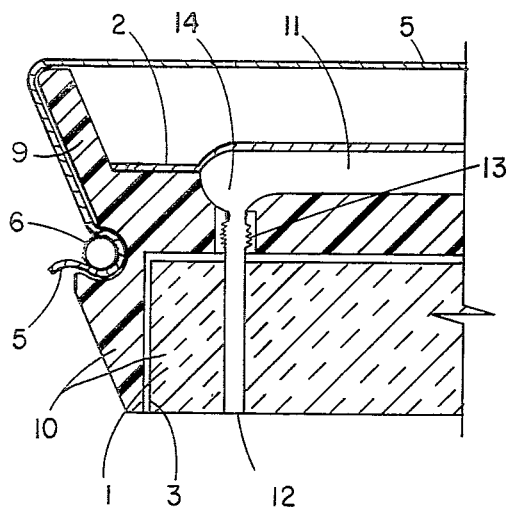
FIG. 6 is an enlarged fragmentary sectional view of the solar panel taken along line 6—6 of FIG. 1, providing for a second alternative structure of the base and a different type of fill/exit tube passageway.

In FIG. 6, a second alternative is shown which is similar in all respects and capabilities as FIG. 5, except that the shell 9 is open at the bottom. In this alternative, rigid insulation is bonded (or foam insulation is sprayed) into the open bottom of shell 9.

In all cases, the base is cured by a thermoplastic resin providing suitable resistance to hot water and solar environments. One example resin is Celon G.C. 25 Acetal Copolymer (glass reinforced).

The lens sheet 2 consists of a flexible sheet of thermoplastic, preferably clear, having excellent resistance to hot water and sunlight ageing, while permitting solar-ray penetration to the transfer media. The lens sheet 2 is bonded to the top surface of the base 10 by ultrasonic, hot plate, dielectric, adhesive, solvent or other means. The indented channel portions of the base remain unbonded to the lens to permit unrestricted flow of the transfer media within the manifold channel 11 and passages 4 formed between the base 10 and the lens sheet 2. As an alternative, not shown, a rigid thermoplastic flat or contoured lens may be bonded to the base.

Figure 1:
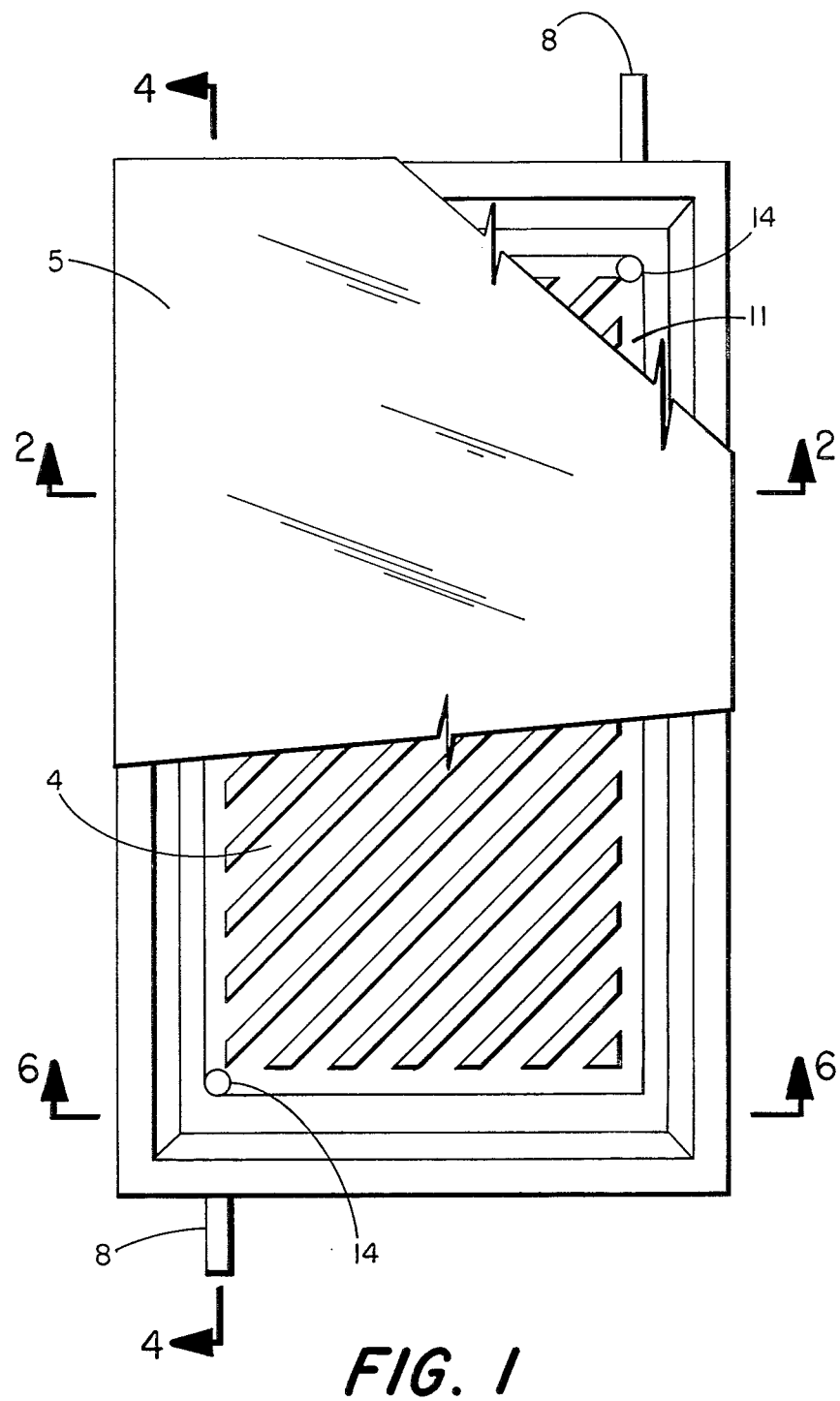
FIG. 1 is a top view of the solar panel with top cover and lens cut.
Figure 2:
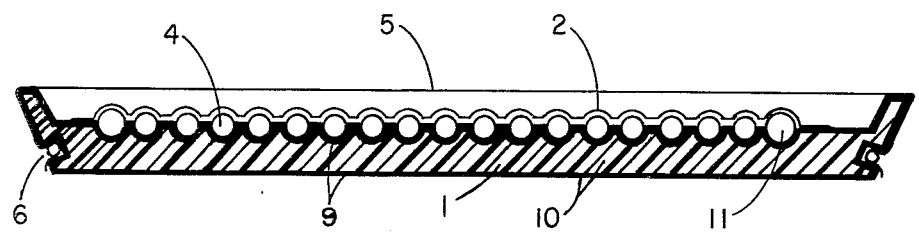
FIG. 2 is a cross sectional view of the panel taken along line 2—2 of FIG. 1.

Transfer media passages 4 and manifold passages 11 formed between the base 10 and lens sheet 2 are shown in the drawings under pressure, i.e. the transfer media forces the flexible lens to elongate to form ovalar passages. The diagonal pattern of the transfer media passages, as shown in FIG. 1, facilitates flow and drainage and permits the collector panel to function equally as well mounted end up or side up. It is only one type of pattern useable under the invention.

An optional clear thermoplastic cover 5 is mounted above the lens sheet 2 for insulation. This cover 5 creates a greenhouse effect in the air space between the cover and the lens sheet 2. Linear cover fastener 6 is mounted along the length of the cover 5 on all four sides of the base 10 and holds the cover 5 in place.

Two alternative transfer media fill/exit tubes are shown. In one embodiment, illustrated in FIG. 4, a hole through the side of the base 10 is provided for in the injection mold process so that fill/exit tubes 8 or threaded inserts (not shown) are inserted and bonded. Alternatively, as shown in FIG. 6, a hole 12 through the bottom of the base 10 is provided for in the manufacturing process so that fill/exit tubes (not shown) or threaded inserts 13 are inserted and bonded.

For ease of storage, stacking, and transportation, the tubes need not be bonded into the based until final assembly at installation site.

OPERATION CYCLE

Water or other transfer media enters the collector panel through a fill tube (either tube), flows through the transfer media passages 4 and the interconnecting manifold passage 11 and out the other (exit) tube. While passing through the flow passages, the transfer media absorbs solar energy in the form of heat (or gives up heat to a cooler atmosphere, if desired). The pressure of the transfer media tends to bulge the flexible thermoplastic lens 2, thus, enhancing incident angle absorption. In the event of freezing of the liquid media, the elastic properties of the flexible lens permits expansion rather than rupture of the flow channels.

Although I have here described the preferred embodiment of my novel invention, many variations and modifications will be apparent to those skilled in the art, and I, therefore, prefer to be limited, not by the specific disclosure herein, but only by the appending claims.

I claim:

1. A solar collector panel comprising:
   a. a base made of structural foam having a top with concave channels therein and having a manifold concave channel along the perimeter of said concave channels and connecting said concave channels, said base having an entry access hole connected to said manifold concave channel and having an exit access hole connected from said manifold, concave channel; and
   b. A thermoplastic lens bonded to the top of the base adjacent on each side of said channels and spanning the concave channels of the base, whereby the channels form transfer passages which carry a liquid media which absorbs solar energy as it flows through the passages, said thermoplastic lens disposed for expansion or contraction in response to expansion or contraction of said liquid media and having an ovular configuration which will enhance incident angle absorption responsive to said expansion.

2. The solar collector panel as described in claim 1, wherein said base further comprises sloping sides which extend above the top of the thermoplastic lens, said sloping sides removably supporting a clear cover.

3. The solar collector panel is described in claim 1, wherein said base is monolithicly formed from a plastic resin impregnated with a solar absorbant color and a sunlight ageing inhibitor.

4. The solar collector panel as described in claim 1, wherein said base has a durable skin which provides support and waterproofing.

5. The solar collector panel as described in claim 1 wherein said base is fabricated to have a separately defined inner core section.

6. The solar collector as described in claim 5, wherein said inner core is coated with a solar-ray reflective material.

7. The solar collector panel as described in claim 5, wherein said inner core section is comprised of heat insulation.

8. The solar collector panel as described in claim 1, wherein said channels are diagonally parallelly oriented, thereby allowing the solar collector panel to be mounted on a sloping plane.

9. The solar collector panel as described in claim 1, wherein said access holes are selectively located in the side and in the bottom of the base, and include female threads for engagement by male threaded tubing.

10. The solar collector panel as described in claim 1, wherein said thermoplastic lens is shaped to form convex channels which are in registry with the concave channels of the base.

11. The solar collector panel as described in claim 1, wherein said access holes are located in diagonally opposite corners of the base.

12. A solar collector panel comprising:
   a. a skin-covered foam base, said skin impregnated with a solar absorbant color, said base having a top with parallel, diagonal concave channels therein, an inner core of heat insulation, a solar-ray reflective material, coated on said inner core, and female threaded access holes selectively located in the side and the bottom of the base leading to the channels; and b. a thermoplastic lens bonded to the top of the base, said lens forming parallel, diagonal, convex channels which are in registry with the parallel, diagonal concave channels of the base, whereby the channels form transfer passages which carry a liquid media which flows through the passages and absorbs solar energy.

13. The solar collector panel as described in claim 12, wherein said base further comprises sloping sides which extend above the top of the parallel, convex channels of the thermoplastic lens, said sloping sides removably supporting a clear cover.

* * * * *